United States Patent
Kogiso et al.

[11] 3,901,593
[45] Aug. 26, 1975

[54] COPYING MACHINES OF THE VARIABLE MAGNIFYING POWER TYPE

[75] Inventors: Masahiro Kogiso, Kokubunji; Toshio Koike, Hachioji; Junichi Yasui, Tama; Yohsuke Igarashi, Tachikawa; Mitsuo Kuromori, Hino; Kiyoshi Ishii, Yamanashi, all of Japan

[73] Assignee: Iwatsu Electric Co., Ltd., Tokyo, Japan

[22] Filed: Mar. 21, 1974

[21] Appl. No.: 453,397

[30] Foreign Application Priority Data
Mar. 27, 1973  Japan............ 48-35198
Mar. 27, 1973  Japan............ 48-35199
Mar. 27, 1973  Japan............ 48-35201
Mar. 27, 1973  Japan............ 48-37213

[52] U.S. Cl............. 355/11; 355/3 R; 355/16; 355/57; 355/58; 355/60
[51] Int. Cl.²............ G03G 15/00; G03B 27/10
[58] Field of Search............ 355/11, 16, 17, 3 R, 10, 355/57, 14, 66, 58, 60

[56] References Cited
UNITED STATES PATENTS

| | | | |
|---|---|---|---|
| 3,382,763 | 5/1968 | Bruning | 355/16 |
| 3,395,610 | 8/1968 | Evans et al. | 355/11 |
| 3,416,860 | 12/1968 | Mihojevich et al. | 355/10 |
| 3,437,410 | 4/1969 | Tregay et al. | 355/66 |
| 3,572,924 | 3/1971 | Matsumoto et al. | 355/60 X |
| 3,671,121 | 6/1972 | Albert | 355/3 R |
| 3,703,334 | 11/1972 | Knechtel | 355/58 X |
| 3,724,940 | 4/1973 | Koizumi | 355/11 |
| 3,784,301 | 1/1974 | Sato | 355/17 |
| 3,792,926 | 2/1974 | Knechtel | 355/11 X |

*Primary Examiner*—Richard L. Moses
*Attorney, Agent, or Firm*—Oblon, Fisher, Spivak, McClelland & Maier

[57] ABSTRACT

In a copying machine of the type comprising an original supporting member, and a variable magnifying power type optical system including a projection lens for projecting the light image of an original and a reflective mirror, and means for moving the projection lens and the reflective mirror in a direction parallel with the original supporting member, there are provided means for feeding a photosensitive paper into the projection field of the optical system, and a photosensitive paper positioning member interlocked with the optical system for arresting the photosensitive paper at a predetermined exposure position in the projection field in accordance with a given magnifying power. Where the copying machine is to be operated as an electrophotographic type, the machine is further provided with means for depositing an electrostatic charge on the surface of an insulating paper thus sensitizing the same, and black frame eliminating means including means for exposing to light the portions of the sensitized paper on the edge portions thereof for discharging the electrostatic charge thus retaining the electrostatic charge only in a predetermined area of the sensitized paper upon which the light image is to be projected by the optical system.

14 Claims, 13 Drawing Figures

COPYING MACHINES OF THE VARIABLE MAGNIFYING POWER TYPE

BACKGROUND OF THE INVENTION

This invention relates to a copying machine, and more particularly an electrophotographic copying machine.

Although many types of a copying machine have been developed there are many problems which are required to be solved.

Figure 1:
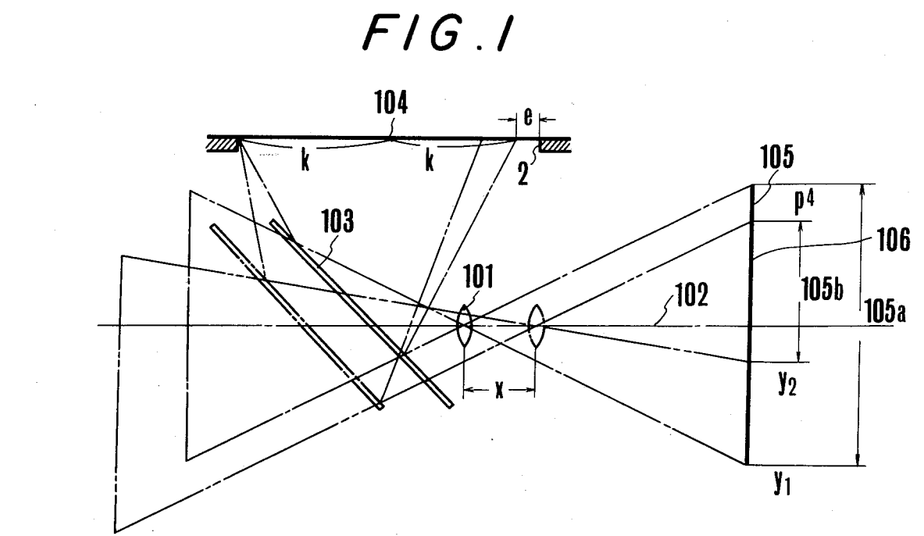
FIG. 1 is a diagram showing the operation of the optical system of a copying machine of the variable magnifying power type.

One problem is involved in a copying machine which is designed to operate at varying magnifying powers. More particularly, in an optical system utilized in a copying machine wherein the magnifying power is varied with an original (including printed or typewritten matter, a handwritten manuscript and a photographic film) and a photosensitive paper held stationary, a light image formed by the light reflected by or transmitting through an original 104 is reflected by a reflective mirror 103 and then focused on a stationary photosensitive paper 106 by means of a projection lens 101. The magnifying power is varied by moving the lens along the optical axis 102 between a solid line position and a dotted line position as shown in FIG. 1. At the same time, the position of the reflective mirror 103 is varied to change the length of the optical path thus performing focusing. However, when the position of the reflective mirror 103 is varied along the optical axis 102, the position of the original 104 relative to the optical axis 102 is varied with the result that the image 105a of the original formed on the photosensitive paper 106 which is formed symmetrically with respect to the optical axis becomes asymmetrical as shown by 105b. For this reason, so long as the photosensitive paper 106 is held at a definite position, the position of the reproduced image 105 will be varied when the magnifying power is varied.

Accordingly, it has been the practice that the operator changes the position of the original or the photosensitive paper when he varies the magnifying power. However, with such manual operations it is impossible not only to always expose a predetermined area of the photosensitive paper but also to decrease the burden of the operator. Although a copying machine has been developed according to which the position of the photosensitive paper is determined in accordance with the indication of a scale representing the magnifying power, such machine can not yet sufficiently decrease the burden of the operator and increase the operating efficiency.

An electrophotographic copying machine of the variable magnifying power type also involves the problem of a "black frame". As is well known in the art, when a predetermined area of a photosensitive paper is exposed to the light image of an original, a black frame is formed at the area not exposed, that is about the exposed area. For this reason, where a photosensitive paper larger than that required is used, after the paper has been deposited with an electrostatic charge, an electroconductive frame member is applied onto the surface of the charged photosensitive paper to discharge the charge in the area corresponding to the black frame thus preventing the formation of the black frame.

However, with this method, as it is extremely difficult to cause the entire area of the electroconductive frame member to uniformly contact with the surface of the photosensitive paper, it is impossible to obtain a clean finishing. In an electrophotographic copying machine of the variable magnifying power type it is necessary to prepare a large number of electroconductive frame members of different sizes for different magnifying powers.

In our research conducted for the purpose of developing efficient black frame eliminating apparatus particularly suitable for use in an electrophotographic copying machine of the variable magnifying power, we have found that there are the following difficulties. More particularly, as has been described, in this type of the copying machine the lower edge of the reproduced picture varies between levels $y_1$ and $y_2$ as the magnifying power is varied. Such variation of the lower edge can be compensated for by interlocking means for holding the photosensitive paper with means for moving the projection lens 101 such that the lower edge of the photosensitive paper coincides with the lower edge of the reproduced picture. However, with the movement of the projection lens, since the upper edge of the reproduced image also varies over a range P which is expressed by the following equation (1), it is impossible to perfectly eliminate the black frame which will be formed on the upper edge of the photosensitive paper by using a black frame eliminating apparatus fixedly secured to the body of the copying machine, $$P = \frac{-1}{f}(x^2 + kx) \quad (1)$$

where $k$ represents the distance between the center or optical axis of the original and one edge thereof at the time of using a unity magnifying power, $f$ a focal distance at any magnifying power and $x$ the distance of the movement of the projection lens.

The black frame can be eliminated by using an original supporting window 2 which is sufficiently large enough to expose the entire surface of the photosensitive paper when a reducing magnifying power is used. But increase in the size of the original supporting window requires a large cover plate which is used to clamp the original thus resulting in an inconvenient operation of the machine and increase in the size thereof.

SUMMARY OF THE INVENTION

Accordingly, it is an object of this invention to provide an improved copying machine of the variable magnifying power type of simple construction capable of automatically positioning a photosensitive paper at a proper position corresponding to a selected magnifying power.

Another object of this invention is to provide an improved copying machine of the variable magnifying power type capable of adjusting the brightness of the light image or the tone of the reproduced copy in accordance with a selected magnifying power.

Still another object of this invention is to provide an improved electrophtographic copying machine wherein a undesirable black frame formed about the periphery of the reproduced copy can be readily eliminated by simple means.

Yet another object of this invention is to provide an improved electrophotographic copying machine of the variable magnifying power type wherein the area of the black frame to be eliminated can be varied in accordance with a selected magnifying power.

According to this invention these and other objects can be accomplished by providing a copying machine of the type comprising an original supporting member adapted to support an original, and a variable magnifying power type optical system including a projection lens for projecting the light image of the original and a reflective mirror located in the path of the light image, the projection lens and the reflective mirror being adjustable in a direction parallel with the original supporting member, characterized in that there are provided means for feeding a photosensitive paper into the projection field of the optical system, and a photosensitive paper positioning member interlocked with the optical system through interlocking means for arresting the photosensitive paper at a predetermined exposure position in the projection field in accordance with a given magnifying power.

According to a modified embodiment of this invention there is obtained an improved electrophotographic copying machine capable of producing copies of excellent quality which are free from undesirable black frames by adding to the copying machine just described means for depositing an electrostatic charge on the surface of an insulating paper thus sensitizing the same, and black frame eliminating means including means for exposing to light the portions of the sensitized paper on the edge portions thereof for discharging the electrostatic charge from said portions thus retaining the electrostatic charge only in a predetermined area of the sensitized paper upon which the light image is to be projected by the optical system.

The photosensitive paper positioning member includes a threaded rod connected to the projection lens through the interlocking means, a manually operable nut mating with the threaded rod for adjusting the position of the photosensitive paper positioning member relative to the projection field and means for guiding the movement of the photosensitive paper positioning member.

The copying machine is further provided with a source of light for illuminating the original to form a light image thereof and means interlocked with the optical system for varying the intensity of the light emanated by the source of light in accordance with the variation of the magnifying power.

The black frame eliminating means described above comprises a casing, a first exposure unit including a first light source contained in the casing and a pair of spaced windows provided through a side wall of the casing at portions corresponding to both side edges of the photosensitive paper, shutter means interlocked with the variable magnifying power type optical system for varying the effective areas of the windows in accordance with a selected magnifying power, and a second exposure unit including a second light source contained in the casing and an elongated window formed through a side wall of the casing and having a width substantially equal to that of the photosensitive paper, the second exposure unit being operated to discharge the electrostatic charge on the upper edge of the photosensitive paper when it is maintained at a predetermined position by the photosensitive paper positioning member.

BRIEF DESCRIPTION OF THE DRAWINGS

The invention can be more fully understood from the following detailed description taken in conjunction with the accompanying drawing, in which.

DESCRIPTION OF THE PREFERRED EMBODIMENTS

Figure 2:
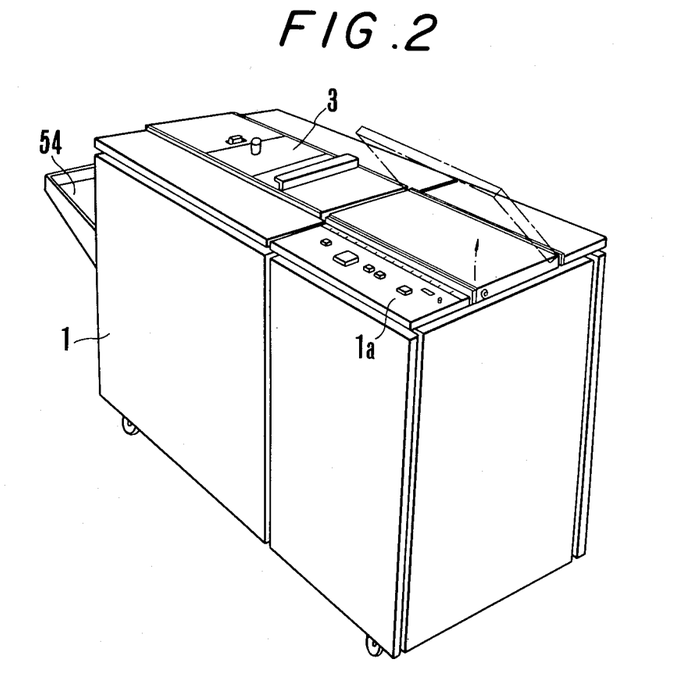
FIG. 2 is a perspective general view of a copying machine of the variable magnifying power type embodying the invention.
Figure 3:
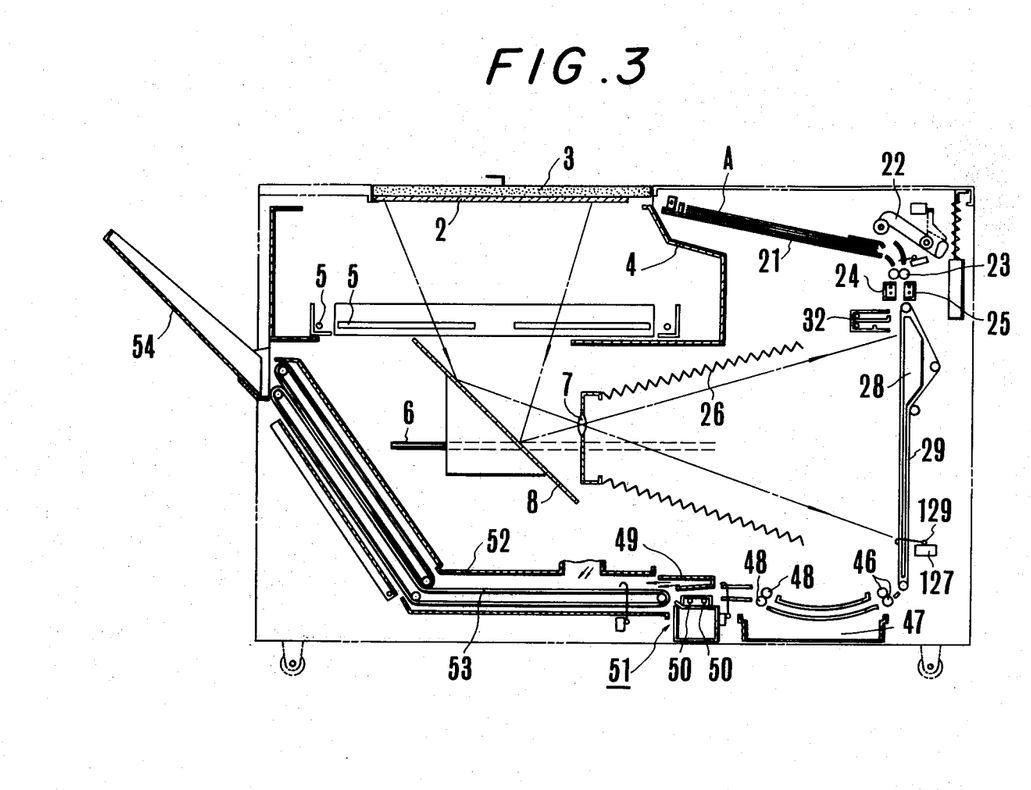
FIG. 3 is a diagrammatic representation of certain essential elements utilized in the copying machine.
Figure 4:
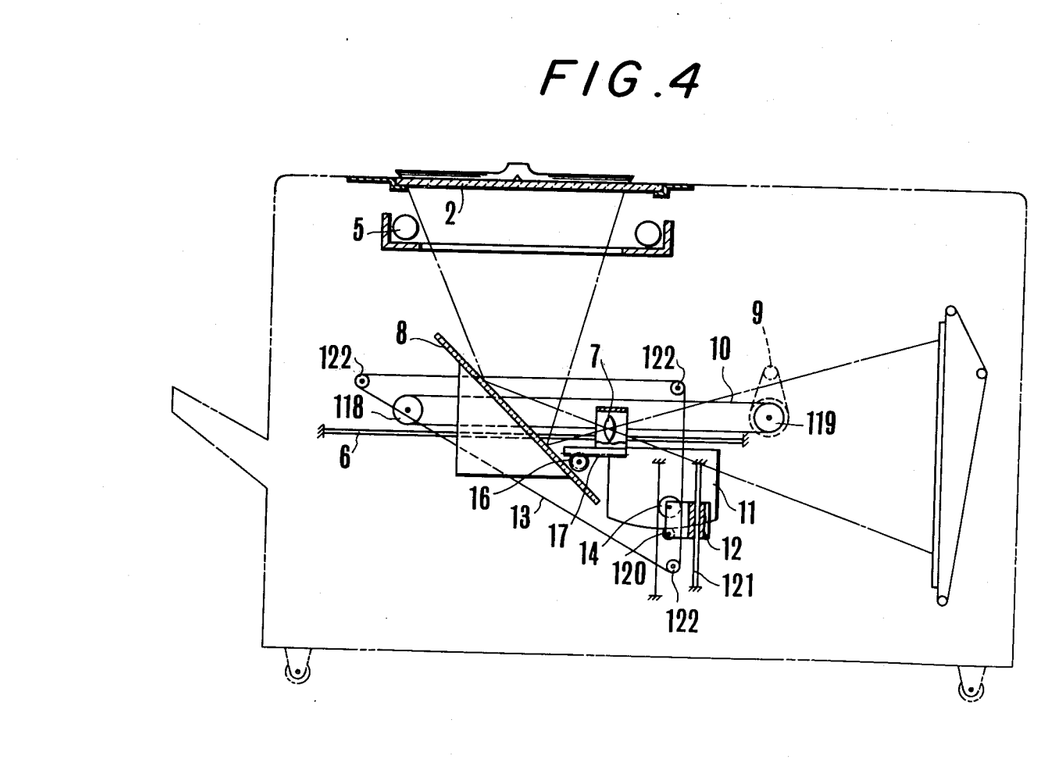
FIG. 4 is a diagrammatic representation of a synchronizing system of the optical system embodying the invention.

The copying machine illustrated in FIGS. 2 and 3 of the accompanying drawings comprises a cubical housing 1. An original supporting window 2 of glass plate is provided for the upper surface of the housing 1 which can be closed by an original depressing cover 3 provided with a soft lining made of a synthetic resin, for example. A dark colored opaque box or housing 4 is provided beneath the window 2 for the purpose of shielding from light other elements of the machine, and a source of light 5 including a plurality of linear lamps mounted on a rectangular frame is mounted on the bottom plate of the box. Although the quantity of the light emanated from the light source 5 can be varied by a light regulating unit to be described later, the light source 5 is also used to illuminate the interior of the housing 1. Further, when the light source 5 is operated to emanate reduced light, such light can be caused to transmit through the original mounted on the window to determine the position of the pattern contained therein. A guide rod 6 extending in parallel with the original supporting window 2 is contained in the housing 1 for supporting a projection lens 7 and a reflective mirror 8 which are operated by an operating means and a synchronising system shown in FIG. 4. The projection lens 7 is secured to an endless cord 10 passing around a pair of pulleys 118 and 119, the latter being driven by an electric motor 9 which may be controlled by a remote control system, not shown. A plate cam 11 is secured to the projection lens 7 to be moved therewith and a roller 120 supported by a follower 12 is disposed to engage the lower or cam surface of the plate cam 11. The vertical motion of the follower 12 is guided by a stationary vertical rod 121. Further, a roller 14 is carried by the follower 12 and an endless cord 13 connected to the reflective mirror 8 passes around this roller 14 and guide rollers 122. In this manner, the reflective mirror 8 is moved in synchronism with the projection lens through plate cam 11, follower 12 and endless cord 13.

Figure 5:
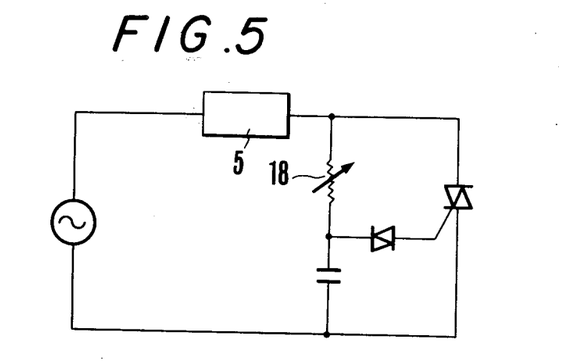
FIG. 5 is a connection diagram of a light regulating circuit utilized in the copying machine.
Figure 6:
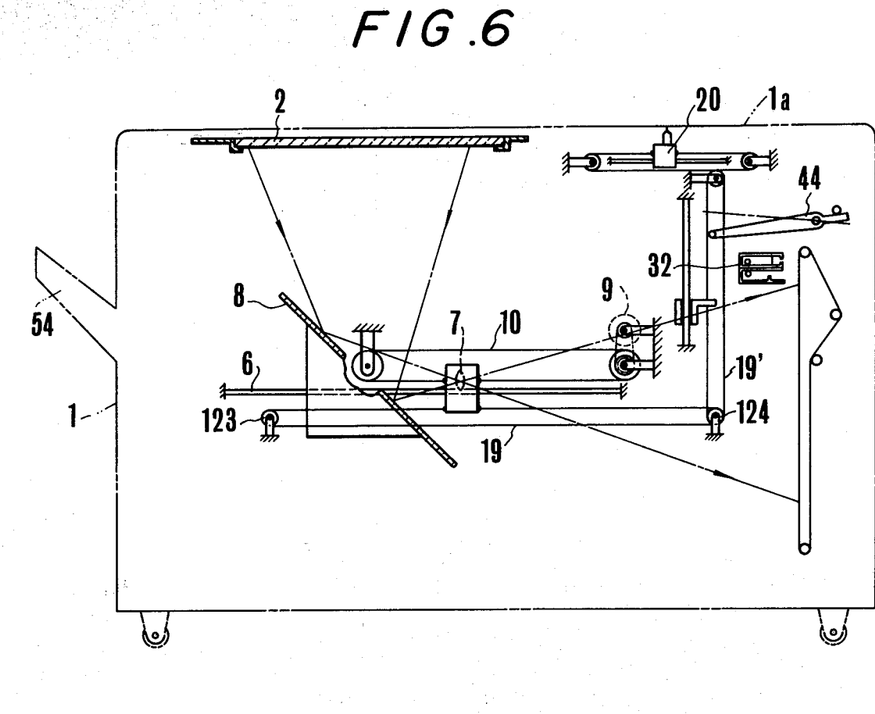
FIG. 6 is a diagram showing a magnifying power indicating system utilized in the copying machine.

The projection lens 7 is provided with a rack 17 (FIG. 4) adapted to mesh with a stationary pinion 16 so as to operate a variable resistor 18 which is connected in series with the light source 5 as shown in FIG. 5, thus comprising a light regulating unit. As shown in FIG. 6 there is also provided a third endless cord 19 which is connected to the projection lens 7 and extending in parallel with the first endless cord 10 and passing around a pair of rollers 123 and 124. The extension 19', of this cord 19 reaches an operating panel 1a of the housing 1 for driving a magnifying power indicating pointer 20.

As shown in FIG. 3, a magazine 21 for supporting a plurality of laminated photosensitive papers A is housed in the upper portion of the housing 1 at a position to the right of box 4. The sheets of photosensitive papers A are supplied, one by one, by a feeding unit 22 positioned at the front end of the magazine 21. The dispatched photosensitive papers pass through a pair of charging devices 24 and 25 which may be corona discharge devices.

One end of a bellows 26 is connected to the support of the projecting lens 7, and a photosensitive paper positioning station 28 is contained in the bellows in the field of the projecting lens 7. The inner surface of the photosensitive paper positioning station 28 is aligned with the path defined between feeding rollers 23 of the photosensitive paper. The station 28 comprises an endless conveyor belt 29 encircling the same and a photosensitive paper positioning member 127 for arresting the photosensitive paper which is supplied from the upper members.

Figure 7:
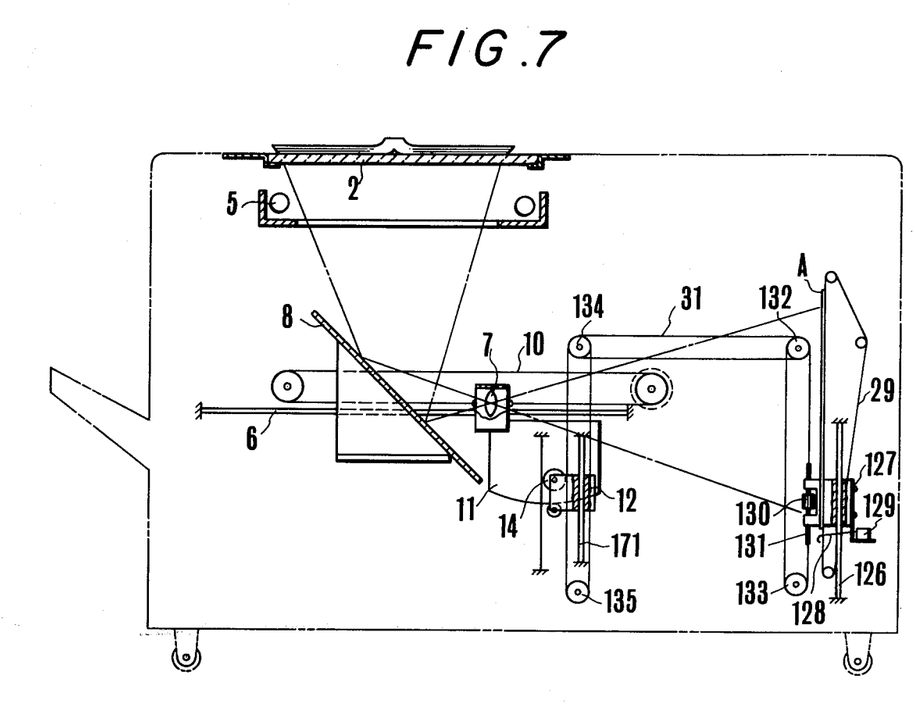
FIG. 7 is a diagrammatic representation of a photosensitive paper positioning system embodying the invention.
Figure 9:
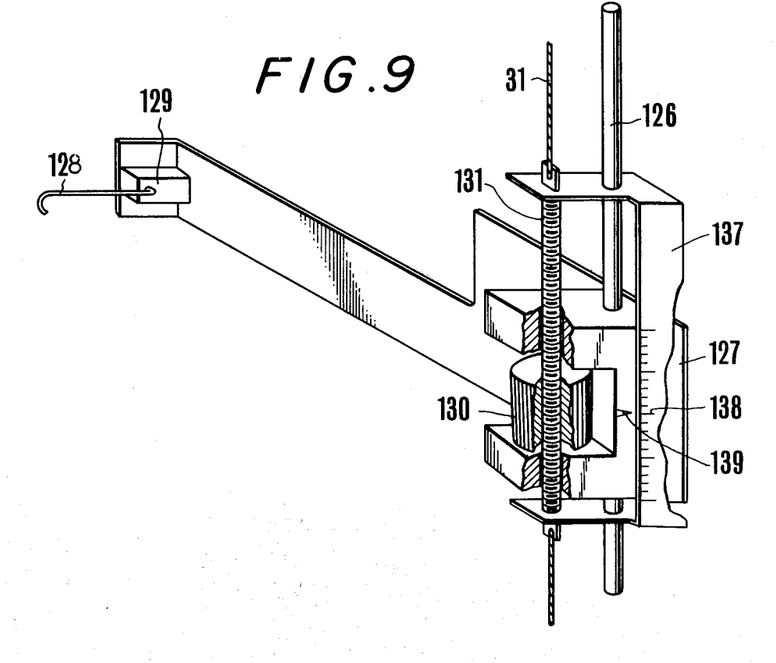
FIG. 9 is a perspective view showing the detail of a position determining member.

The photosensitive paper positioning member 127 is operated by an operating system as shown in FIG. 7, which comprises a fourth endless cord system 31 driven by the roller 14 carried by the follower 12. Near the lower end of the conveyor belt 29 is positioned a position determining member 127 which is guided by a stationary guide rod 126. A microswitch 129 having an operating handle or a feeler 128 disposed on one side of the conveyor belt 29 is mounted on the position determining member 127. As shown in FIG. 9, the position determining member 127 takes a form of a C-shaped yoke in which is positioned an adjusting nut 130 mating with a threaded rod 131. The opposite ends of the threaded rod 131 are connected to the endless cord 31 passing around rollers 132, 133, 134, 135 and 14. As shown in FIG. 9 a C-shaped scale board 137 is provided to surround the position determining member 127. The upper and lower yokes of the scale board 137 are guided by the guide rod 126 and the opposite ends of the threaded rod 131 are secured to these yokes. A graduated scale 138 is provided on the center leg of the scale board 137 to cooperate with a pointer 139 mounted on the position determining member. Although not shown in the drawing, the housing 1 is provided with a window through which the scale 138 and the pointer 139 can be observed.

The copying machine thus far described operates as follows. To vary the magnifying power of the optical system, the driving motor 9 is operated to move the projecting lens 7 along the optical axis through means of the endless cord 10. Then, follower 12 is moved in the vertical direction along guide rod 121 because roller 120 is driven by the cam surface of the plate cam 11 which is moved together with the projecting lens 7. As the follower 12 is moved in the vertical direction, the roller 14 carried by the follower 12 also drives position determining member 127 in the vertical direction along guide rod 126 through endless cord system 31. Thus, the position determining member 127 is set at a predetermined position corresponding to the position of the projecting lens 7 for a selected magnifying power of the optical system. When the lower end of the photosensitive paper A conveyed by the belt 29 touches the feeler 128, the microswitch 129 is operated to stop the running of the conveyor belt 29. Thus, the photosensitive paper A is held stationary by the position determining member 127. Then the light source 5 is operated to project the light image of the object supported on the original supporting window onto the photosensitive paper A. By turning nut 130, it is possible to adjust the vertical position of the position determining member, thereby adjusting the relative position of the light image and the photosensitive paper A.

Figure 8:
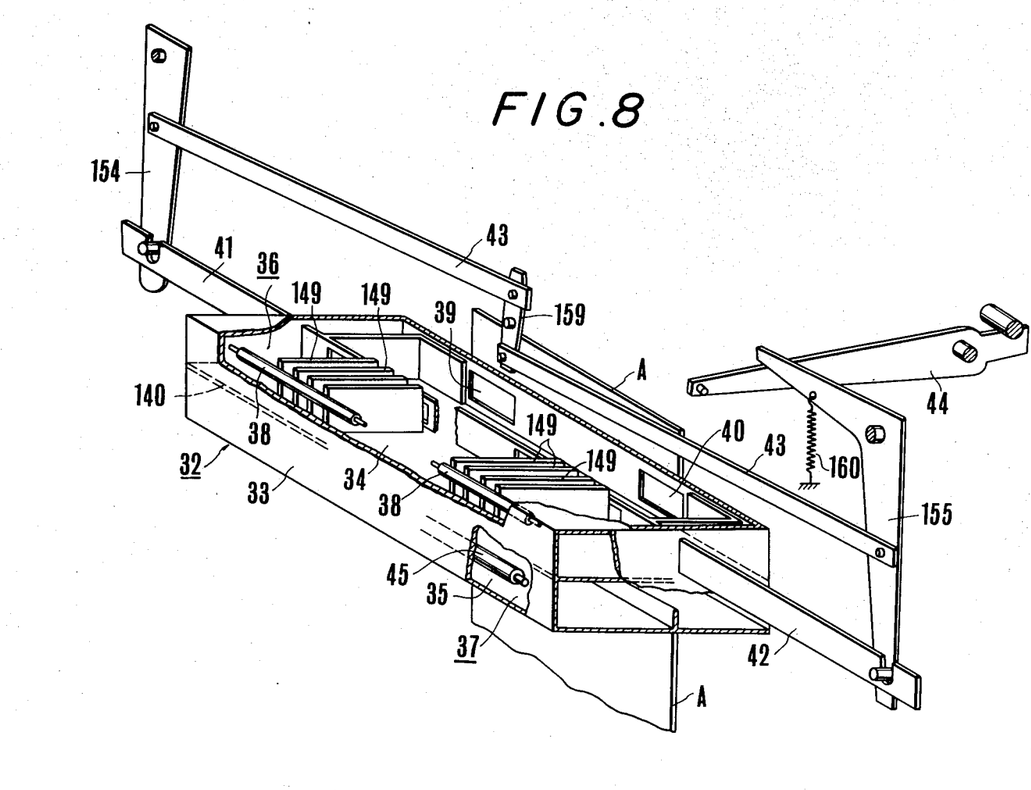
FIG. 8 is a perspective view, partly broken away, of a black frame eliminating apparatus embodying the invention.
Figure 10:
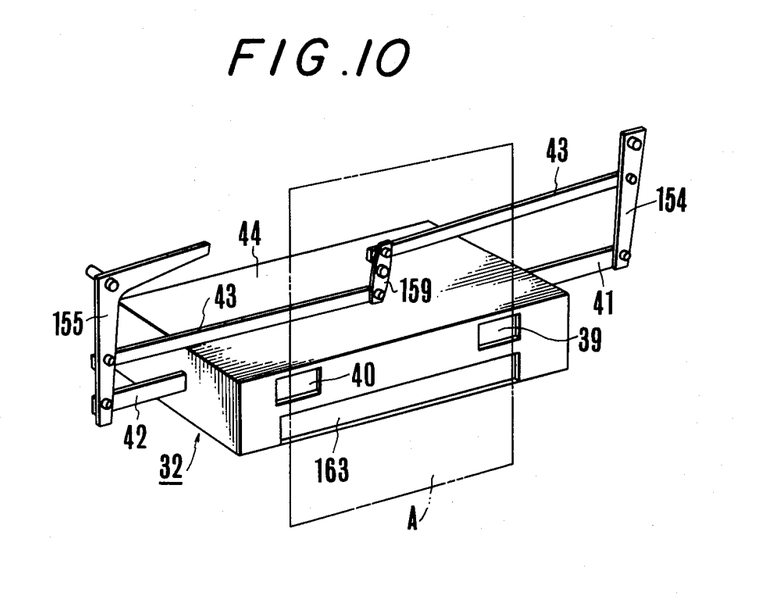
FIG. 10 is a perspective view of a portion of the black frame eliminating apparatus.

As shown in FIG. 3, near the upper end of the photosensitive paper positioning station 28 is provided a black frame eliminating apparatus 32, the details thereof being shown in FIGS. 8 and 10. As shown in FIG. 8, the black frame eliminating apparatus 32 comprises a first exposure unit 36 contained in the upper compartment 34 of a casing 33 and utilized for eliminating the black frame on both side edges of the photosensitive paper and a second exposure unit 37 disposed in the lower compartment 35 and utilized to eliminate the black frame on the upper edge of the photosensitive paper. The upper and lower compartments are partitioned by a thin partition wall 140. The first exposure unit 36 comprises a light source 38 contained in the upper compartment 34 and a pair of shutter plates 41 and 42 disposed between the light source 38 and the windows 39 and 40 in the rear side wall of the casing 33. The shutter plates 41 and 42 are operated in synchronism with a link mechanism 43 in a direction parallel to the plane of the photosensitive paper A. The windows 39 and 40 are positioned on both side edges of the photosensitive paper A so that the width of the exposed area of the photosensitive paper is determined by the adjustment of the shutter plates 41 and 42. The second exposure unit 37 includes a light source 45 disposed in the lower compartment 35 for illuminating the upper edge of the photosensitive paper through a window 163 (see FIG. 10) of the rear side wall of the casing. The width of the window 163 is substantially equal to that of the photosensitive paper A and its field of illumination is selected to partially overlap the projection of the margin e of the original supporting window 2 (see FIG. 1). A plurality of bucky grids 149 are provided between the light source 38 and the shutter plates 41 and 42 in front of the windows 39 and 40.

The outer ends of the shutter plates 41 and 42 are connected to a lever 154 and a crank arm 155 which are pivotally mounted on the body of the copying machine. The intermediate points of the lever 154 and crank arm 155 are connected to opposite ends of a pivoted link 159 through connecting levers 43. The crank arm 155 is normally biased in the counterclockwise direction as viewed in FIG. 8 by means of a spring 160. The upper arm of the crank arm 155 is operated by a pivoted operating lever 44 which is operated by extension 19' of the endless cord 19 as shown in FIG. 6.

The black frame eliminating apparatus described above operates as follows. Thus, the charge applied to the photosensitive paper A by charging devices 24 and 25 is removed at both side edges of the paper while it passes through the black frame eliminating apparatus 32 in accordance with a preset magnifying power. More particularly, as the projecting lens 7 is moved to vary the magnifying power, the operating lever 44 is rotated by endless cord 19' interlocked with the projecting lens to operate the shutter plates 41 and 42 of the first exposure unit 36. This displacement of the shutter plates 41 and 42 determines the quantity of the light transmitted through the bucky grids 149 as well as the effective widths of the windows 39 and 40. In this manner, both side edges of the photosensitive paper A are exposed to light with a width proportional to the selected magnifying power.

Figure 11A:
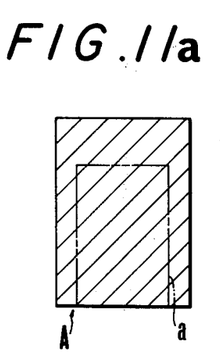
FIG. 11a, 11b and 11c are diagrams utilized to explain the operation of the black frame eliminating apparatus.
Figure 11B:
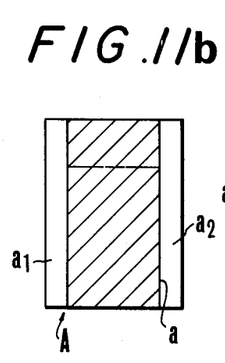
Figure 11C:
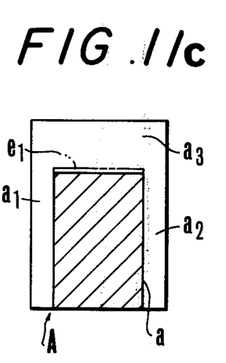

FIG. 11a shows a charged photosensitive paper A in which the area bounded by dot and dash lines $a$ represents an area to be exposed to the light image of the original. As shown in FIG. 11b, both side edges $a_1$ and $a_2$ are removed of charge by the operation of the first exposure unit 36. Thereafter, the photosensitive paper A is arrested by the position determining member 127 in the positioning station 28. At this time, the light source 45 of the second exposure unit 37 is operated to expose the upper edge $a_3$ of the photosensitive paper A whereby the charge remains only in the preselected area $a$ bounded by the dot and dash lines as shown in FIG. 11c. As the field of illumination of the second exposure unit 37 has been selected as described hereinabove, although the exposed area of the upper edge $a_3$ partially overlaps the preselected area $a$ as indicated by a narrow area $e_1$, since this overlapping area $e_1$ corresponds to the margin $e$ of the original supporting window and since the width of this narrow area $e_1$ varies in accordance with the selected magnifying power, its effect upon the reproduced picture is negligeble. As a result, by providing a small margin $e$ for the original supporting window it is not necessary to adjust the position of the black frame eliminating apparatus relative to the photosensitive paper. In other words, it is possible to construct the black frame eliminating frame as of a stationary type, thus simplifying the construction and operation of the copying machine.

After the light image exposure, the photosensitive paper can be developed and fixed in a manner well known in the art. In an example illustrated in FIG. 3, a toner tank 47 equipped with feed rollers 46 is disposed in the right lower corner of the housing 1 beneath the photosensitive paper positioning station, and rollers 48 are positioned on the output side of the toner tank 47 for removing excess toner followed by a fixing station 51 including an air duct 49 and an electric heater 50. An L-shaped air duct 52 containing an endless conveyor belt 53 is connected to the output of the air duct 49 to collect the developed and fixed copies in a collecting rack 54 mounted on the lefthand side wall of the housing 1.

The operation of the copying machine as a whole is as follows. An original is placed on the original supporting window 2 with its front surface faced downwardly. At this time, the light emanated from the exposure light source 5 may be reduced to permit the operator to observe the pattern of the original so as to thereby correct the position of the original. Then the position projection lens 7 is adjusted to obtain a desired magnifying power by operating motor 9 while observing the magnifying power indicating pointer 20. As the projecting lens 7 is moved, the reflective mirror 8 is also moved to a predetermined position along guide rod 6 by the action of plate cam 11, follower 12 and the second endless cord 13. Concurrently therewith, the photosensitive paper positioning member 127 is moved by the endless cord 31 and the follower 12 to fix the lower edge of photosensitive paper at a predetermined position, and the shutter plates 41 and 42 of the black frame eliminating apparatus 32 are moved to the position corresponding to the selected magnifying power by lever 44 and the endless cords 19 and 19' thus completing the preparation of the copying machine.

Then, a start button, not shown, is operated to feed one sheet of photosensitive paper A from magazine 21 and the paper A is charged with electrostatic charge while passing through charging devices 24 and 25. While the charged or sensitized paper A passes through the black frame eliminating apparatus 32, light source 38 of the first exposure unit 36 is lighted to remove the charge on both side edges of the photosensitive paper A. Then the exposure light source 5 is lighted with a brightness adjusted by the light regulating unit to project the light image of the original on the photosensitive paper with the selected magnifying power. At the termination of the light image projection, the light source 38 of the second exposure unit 37 is lighted to remove the charge from the upper edge of the photosensitive paper A while it is being transferred into the toner tank 47 by the endless conveyor 29. Then, the electrostatic latent image formed on the photosensitive paper A is developed by the toner contained in the toner tank 47, and the developed toner image is fixed by heater 51. The completed copy is collected in the rack 54.

According to this invention, it is possible to visually confirm the correct position of the original, to select any desired magnifying power and produce copies of good quality from which black frames have been eliminated. It will be clear that where the black frame eliminating apparatus is not used the photosensitive paper may be an ordinary photographic photosensitive paper, in which case charging devices may be eliminated, and developing and fixing devices are substituted by those used in the art of photography.

What is claimed is:

1. In a copying machine of the type comprising an original supporting member adapted to support an original and a variable magnifying power type optical system including a projection lens for projecting the light image of said original and a reflective mirror located in the path of said light image, said projection lens and said reflective mirror being adjustable in a direction parallel with said original supporting member, the improvement which comprises means for feeding a photosensitive paper into the projection field of said optical system, and a photosensitive paper positioning member interlocked with said optical system through interlocking means for arresting said photosensitive paper at a predetermined exposure position in said projection field in accordance with a given magnifying power.

2. The copying machine according to claim 1 wherein said interlocking means comprises a plate cam movable with said projection lens, a follower operated by said plate cam, and an endless cord driven by said follower and connected to said photosensitive paper positioning member.

3. The copying machine according to claim 1 wherein said photosensitive paper positioning member includes a threaded rod connected to said projecting lens through said interlocking means, a manually operable nut mating with said threaded rod for adjusting the position of said photosensitive paper positioning member relative to said projection field, and means for guiding the movement of said photosensitive paper positioning member.

4. The copying machine according to claim 3 wherein said photosensitive paper positioning means further comprises an endless belt conveyor encircling said photosensitive positioning member and adapted to convey a photosensitive paper thereto, and a microswitch having an operating handle positioned in the path of said photosensitive paper for stopping the running of said endless conveyor belt when said operating handle is engaged with the leading edge of said photosensitive paper.

5. The copying machine according to claim 1 which further comprises a source of light for illuminating said original to form said light image and means interlocked with said optical system for varying the intensity of the light emanated by said source of light in accordance with the variation of the magnifying power.

6. The copying machine according to claim 5 wherein said means for varying the intensity of the light emanated by the source of light comprises a variable resistor connected in series therewith and means responsive to the movement of said projecting lens for varying said variable resistor.

7. The copying machine according to claim 1 which further comprises indicating means interlocked with said optical system for indicating a selected magnifying power.

8. The copying machine according to claim 1 which further comprises:
black frame eliminating means including means for exposing to light the portions of said photosensitive paper located on the edge portions thereof for discharging said electrostatic charge from said portions thus retaining the electrostatic charge only in a predetermined area of said photosensitive paper upon which said light image is to be projected by said optical system.

9. In an electrophotographic copying machine of the type comprising an original supporting member adapted to support an original, a variable magnifying power type optical system including a projection lens for projecting the light image of said original and a reflective mirror located in the path of said light image, said projection lens and said reflective mirror being adjustable in the direction parallel with said original supporting member, means for depositing an electrostatic charge on the surface of an insulative paper thus sensitizing the same, means for conveying the photosensitive paper thus sensitized into a photosensitive paper positioning station in the projection field of said optical system, the improvement which comprises:
black frame eliminating means including means for exposing to light the portions of said photosensitive paper located on the edge portions thereof for discharging said electrostatic charge from said portions thus retaining the electrostatic charge only in a predetermined area of said photosensitive paper upon which said light image is to be projected by said optical system,
said black frame eliminating means comprising a casing, a first exposure unit including a first light source contained in said casing and a pair of spaced windows provided through a slide wall of said casing at portions corresponding to both side edges of said photosensitive paper, shutter means interlocked with said variable magnifying type optical system for varying the effective areas of said windows in accordance with a selected magnifying power, and a second exposure unit including a second light source contained in said casing and an elongated window formed through a side wall of said casing and having a width substantially equal to that of said photosensitive paper, said second exposure unit being operated so as to discharge the electrostatic charge on the upper edge of said photosensitive paper when it is maintained at a predetermined position in said photosensitive paper positioning station.

10. The copying machine according to claim 9 wherein said elongated window has a width that slightly overlaps a predetermined area of said photosensitive paper in which said light image is to be projected by said optical system.

11. The copying machine according to claim 9 wherein said first and second exposure units are contained in independent compartments.

12. The copying machine according to claim 9 wherein said first exposure unit further comprises bucky grids positioned between said first light source and said shutter means.

13. The copying machine according to claim 9 wherein said shutter means comprises a pair of shutter plates respectively positioned between said first light source and said pair of windows and means for moving said shutter plates across said windows in accordance with a selected magnifying power.

14. The copying machine according to claim 9 which further comprises means for developing an electrostatic latent image formed on the sensitized area of said photosensitive paper corresponding to the projected latent image with a toner, and means for fixing the developed tonner image.

* * * * *